United States Patent

Schmidt et al.

[11] 3,843,605
[45] Oct. 22, 1974

[54] 3-(TRIHYDROCARBYLPHOSPHORANYLIDENE)-2,5-PYRROLIDINEDIONES AS LATENT CATALYSTS FOR PROMOTING THE REACTION BETWEEN PHENOLS AND EPOXY RESINS

[75] Inventors: Dennis L. Schmidt, Lake Jackson, Tex.; George A. Doorakian, Waltham, Mass.

[73] Assignee: The Dow Chemical Company, Midland, Mich.

[22] Filed: Nov. 28, 1973

[21] Appl. No.: 419,737

Related U.S. Application Data

[63] Continuation-in-part of Ser. No. 290,889, Sept. 21, 1972, abandoned.

[52] U.S. Cl............ 260/47 EP, 252/182, 260/2 EP, 260/46.5 R, 260/47 EN, 260/47 EC, 260/47 EQ, 260/49, 260/51 LP, 260/59
[51] Int. Cl............................................. C08g 30/04
[58] Field of Search..... 260/47 EP, 47 EN, 59, 2 A, 260/51 EP, 326 E, 606.5 P, 46.5 R; 265/182, 49

[56] References Cited
UNITED STATES PATENTS
3,356,645  12/1967  Warren................................. 260/47

*Primary Examiner*—William H. Short
*Assistant Examiner*—T. Pertilla
*Attorney, Agent, or Firm*—L. Wayne White

[57] ABSTRACT

The 3-(trihydrocarbylphosphoranylidene)-2,5-pyrrolidinediones are novel latent catalysts for promoting the reaction between epoxides and phenols. Examples of said catalysts include

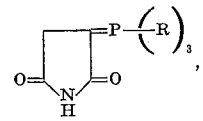

wherein R is phenyl or n-butyl.

14 Claims, No Drawings

3-(TRIHYDROCARBYLPHOSPHORANYLIDENE)-2,5-PYRROLIDINEDIONES AS LATENT CATALYSTS FOR PROMOTING THE REACTION BETWEEN PHENOLS AND EPOXY RESINS

CROSS-REFERENCE TO RELATED APPLICATION

This application is a continuation-in-part of our co-pending application Ser. No. 290,889, filed Sept. 21, 1972 and now abandoned.

BACKGROUND OF THE INVENTION

1. Field of the Invention

This invention pertains to novel latent catalysts for promoting the reaction between epoxides and phenols. The invention pertains particularly to novel latent catalysts for promoting the reaction between polyhydric aromatic compounds (phenols) and epoxy resins (polyepoxides).

2. Description of the Prior Art

The class of compounds here referred to as "epoxy resins" is well known and includes many members. Epoxy resins bear an average of more than one oxirane (epoxy) group per molecule. They react with a variety of compounds bearing active hydrogen, e.g., phenols, primary and secondary amines, mercaptans, water, etc., to form the corresponding phenolic ether, secondary or tertiary amine, thioether, etc.

The reaction of epoxy resins with appropriate phenols is a convenient method of increasing the molecular weight of the epoxy resin but otherwise retaining their basic chemical characteristics.

The reaction of epoxy resins with phenolic hydroxyl groups is rather slow but is promoted (catalyzed) by bases and quaternary ammonium compounds. Several problems are normally encountered when using such catalysts. For example: First, they usually react with the epoxy resin alone and thus preclude the option of marketing what is known in the art as a "precatalyzed epoxy resin." Second, they are typically nonselective in that they promote the reaction of epoxy resin with both the phenolic hydroxyl groups of the reactant and the aliphatic hydroxyl groups in the product. This results in undesirable branching and/or cross-linking. Third, they generally have to be blended with the epoxy resin and phenolic reactants just prior to use because of the high rate of subsequent reaction. Proper formulation and complete mixing under such circumstances are difficult.

These and other problems have now been solved by the subject invention.

SUMMARY OF THE INVENTION

It has now been discovered that the 3-(trishydrocarbylphosphoranylidene)-2,5-pyrrolidinediones are novel catalysts for promoting the reaction between vicinal epoxides and phenols and are particularly useful in promoting the reaction between epoxy resins and polyhydric aromatic compounds (phenols).

Unlike prior art catalysts, the subject catalysts are essentially unreactive with epoxy resins at conventional storage temperatures. As a result of this, the epoxy resin and catalyst can now be blended to form novel precatalyzed epoxy resins.

Additionally, the subject catalysts are specific in that they promote the reaction of epoxy resins with phenolic hydroxyl groups to a far greater extend than they extent the reaction of epoxy resin with aliphatic hydroxyl groups in the reaction product. Thus, little if any branched and/or cross-linked product is formed by reacting a difunctional epoxy resin with a difunctional phenol in the presence of the subject catalysts.

Finally, the subject catalysts are unique because their catalytic activity is latent at temperatures below about 50°C. Consequently, mixtures of epoxy resins, phenols and the subject catalysts have greatly extended pot lives over prior art mixtures. In those instances where the epoxy resin is essentially unreactive toward the phenol (absent a catalyst or elevated temperature), the subject catalysts can be added and the mixtures marketed as a completely formulated composition.

The Catalysts

The 3-(trihydrocarbylphosphoranylidene)-2,5-pyrrolidinediones are, as a class, generally known. Each member of the class has the basic nucleus:

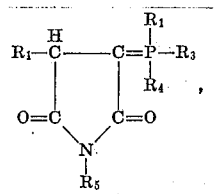

wherein $R_1$ is hydrogen or hydrocarbyl and is preferably hydrigen, $R_2$—$R_4$ are hydrocarbyl, and $R_5$ is hydrogen or hydrocarbyl. Such compounds are conventionally prepared by contacting a trihydrocarbylphosphine with maleimide or an inertly substituted derivative thereof. Such compounds therefore include 3-trialkyl-, 3-triaryl-, 3-trialkaryl-, 3-triaralkyl-, 3-tricycloalkyl- and 3-(trialkenylphosphoranylidene)-2,5-pyrrolidinediones and the like. Illustrative examples include: 3-trimethyl-, 3-triethyl-, 3-tri(n-butyl)-, 3-trihexyl-, 3-tridecyl-, 3-tridodecyl-, 3-trioctadecyl-, 3-di(n-butyl)-3-hexyl-, 3-triphenyl-, 3-tri(methylphenyl)-, 3-tri(butylphenyl)-, 3-tri(octylphenyl)-, 3-tri(benzyl)-, 3-tri(phenethyl), 3-tri(phenylbutyl)-, 3-tri(3,5-dimethylbenzyl)-, 3-tricyclohexyl-, 3-triallyl-, 3-cyclohexenylphosphoranylidene-2,5-pyrrolidinedione and the corresponding compounds bearing a hydrocarbyl substituent in the 4-position such as 4-methyl, 4-ethyl, 4-propyl, 4-butyl, 4-phenyl, etc., and other like compounds, and the corresponding compounds bearing an N-hydrocarbyl substituent, such as 1-methyl, 1-ethyl, 1-hexyl, 1-decyl, 1-octadecyl, 1-phenyl, 1-naphthyl, 1-tolyl-, 1-allyl, 1-benzyl, 1-cyclohexyl, etc. Mixtures of such compounds can also be used.

The amount of catalyst used can be varied over a wide range. Generally, however, they are used in concentrations of from about 0.001 to about 10 percent by weight, based on the combined weight of epoxy resin and phenol. Preferably, the catalyst is included in amounts of from about 0.05 to about 5 percent by weight.

The Reactants

As stated above, the reactants here used are well-known classes of compounds. This is illustrated, for example, by USP Pat. Nos. 2,216,099, 2,633,458, 2,658,885, 3,477,990 and the text "Handbook of Epoxy Resins" by Lee and Neville, McGraw-Hill (N.Y. 1967). Each member of these known classes is suitable for use herein.

The Epoxy Reactants

The vicinal epoxides, for example, are organic compounds bearing one or more

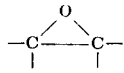

groups. The alkylene oxides of from 2 to about 24 carbon atoms, the epihalohydrins and the epoxy resins are perhaps the best known and most widely used members of the genus. Ethylene oxide, 1,2-propylene oxide, 1,2-butylene oxide and epichlorohydrin are the preferred monoepoxides. There are two preferred subclasses of epoxy resins. The first subclass corresponds to the general formula

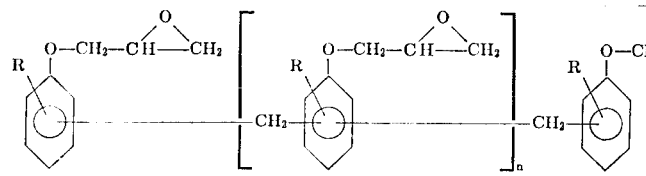

wherein R is hydrogen or an alkyl radical of 1-4 carbon atoms (and is preferably hydrogen) and $n$ is from about 0.1 to about 10, preferably from about 1 to about 2. Preparation of these polyepoxides is illustrated in U.S. Pat. Nos. 2,216,099 and 2,658,885. The second subclass corresponds to the general formula

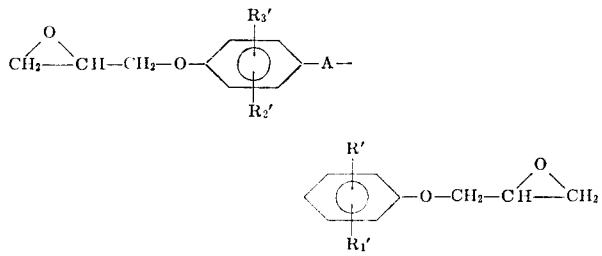

wherein $R'$, $R'_1$, $R'_2$ and $R'_3$ are each independently hydrogen, bromine and chlorine and wherein A is an alkylene (e.g., methylene) or alkylidene (e.g., isopropylidene) group having from about 1 to about 4 carbon atoms, or A is

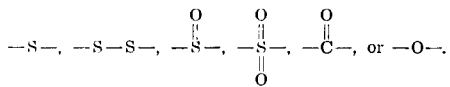

The diglycidyl ether of 4,4'-isopropylidenediphenol is the most preferred epoxy resin.

The Phenolic Reactants

The phenols are organic compounds having one or more hydroxyl groups attached to an aromatic nucleus. This class of compounds therefore includes phenol, alpha and beta-naphthol, o-, m-, or p-chlorophenol, alkylated derivatives of phenol (e.g., o-methyl-, 3,5-dimethyl-, p-t-butyl- and p-nonylphenol) and other monohydric phenols as well as polyhydric phenols, such as resorcinol, hydroquinone, etc. The polyhydric phenols bearing from 2 to 6 hydroxyl groups and having from 6 to about 30 carbon atoms are particularly useful in the reaction with epoxy resins to form high molecular weight resins (linear or cross-linked) useful in coatings. Particularly preferred polyhydric phenols are those corresponding to the formula

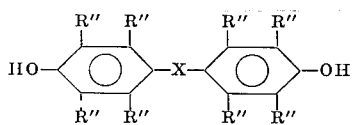

wherein $R''$ is hydrogen, halogen (fluoro, chloro or bromo) or hydrocarbyl and X is oxygen, sulfur, —SO—, —SO$_2$—, bivalent hydrocarbon radicals containing up to 10 carbon atoms, and oxygen, sulfur and nitrogen-containing hydrocarbon radicals, such as —OR'''O—, —OR'''OR'O—, —S —R'''—S—, —S—R'''—S—R'''—S—, —OSiO—, —OSiOSiO—,

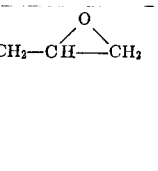

and —SO$_2$—R'''—SO$_2$— radicals wherein $R'''$ is a bivalent hydrocarbon radical. 4,4'—Isopropylidenediphenol (i.e., bisphenol A) is the most preferred phenol.

Ratio of Reactants

The ratio of epoxide to phenol in the subject process can vary over a wide range depending upon the product desired. H.g. if a product terminated with a phenolic ether group is desired, obviously one would employ an excess of phenol in the process, etc.

Solvents

In most instances the reactants are liquid and no solvent or diluent is needed. In other cases, however, where one or both of the reactants are solid or viscous liquids, an inert solvent or diluent can be used advantageously. Suitable such inert solvents or diluents are known to those skilled in the art and include ketones (such as acetone, methyl ethyl ketone, etc.), hydrocarbons (such as benzene, toluene, xylene, cyclohexane, ligroine, etc.) and the like.

Other Process Parameters

Generally, the reaction mixture is warmed at temperatures in the range of from about 50°C. to about 225°C. (preferably 100°-175°C.) until an exotherm begins and, after the exotherm has peaked, subsequently warmed in the same range for an additional time to assure substantially complete reaction. Atmospheric or superatmospheric pressures (e.g., up to about 200 psig.) are common.

The Reaction Products

The products here produced are generally known compounds in industry. The particular product produced will vary in properties depending upon the selection and ratio of reactants used in the process. Every combination of reactants, of course, need not be discussed but the following discussion will illustrate the types of products which can be produced.

The reaction products here produced by reacting an epoxy resin with a phenol in the presence of the subject catalysts are phenolic ethers bearing one or more aliphatic secondary hydroxyl groups. Such aliphatic hydroxyl groups are formed in the ring-opening reaction between the oxirane and phenolic hydroxyl groups. Additionally, the reaction products bear a terminal epoxy group(s) or a phenolic hydroxyl group(s) depending upon the ratio of reactants. Consequently, they are reactive intermediates which can be cured (cross-linked) with many polyfunctional curing agents to form hard, insoluble solids which are useful coatings. A listing of several known curing agents which are suitable for use herein is found in U.S. Pat. No. 3,477,990. The cured products (particularly those of high molecular weight) are useful as surface coatings, as adhesive layers in laminates, coatings on filament windings, in structural binding applications, and the like. The reaction products prepared from halogenated (particularly brominated) phenols are particularly useful in flameproofing applications since they tend to be self-extinguishing. Thus, they are useful in forming cured coatings for wood paneling and as adhesive layers in wood laminates, etc.

Hydraulic fluids are here prepared by reacting a lower alkylene oxide with a phenol in substantially equimolar amounts. E.g., $C_6H_4OCH_2CH_2OH$ and $C_6H_4O(CH_2CH_2O)_2H$ are illustrative.

Experimental

The following examples further illustrate the invention.

Example 1

To a reaction vessel equipped with a stirring means and a temperature recording means were charged under a nitrogen purge 75.79 parts by weight of the diglycidyl ether of 4,4'-isopropylidenediphenol, 24.21 parts of 4,4'-isopropylidenediphenol (bisphenol A) and 0.15 part of 3-(triphenylphosphoranylidene)-2,5-pyrrolidenedione dissolved in about 5 ml. of methanol. The stirred reaction mixture was warmed from ambient temperature to 150°C. at a rate of 3°C./minute. At 150°C., the heat was turned off. A reaction exotherm occurred which peaked at about 213°C. The reaction mixture was warmed at 150°C. for an additional 2.5 hours after the exotherm subsided. Theoretical epoxide content = 8.20 percent. Observed = 8.13 percent.

Examples 2-3

In like manner 377.5 g. of the diglycidyl ether of bisphenol A reacted with 122.5 g. of bisphenol A in the presence of: (2) 1-methyl-3-(triphenylphosphoranylidene)-2,5-pyrrolidinedione (0.573 g.), (3) 1-phenyl-3-(triphenylphosphoranylidene)-2,5-pyrrolidinedione (0.68 g.). The reaction mixture in each instance was warmed to 150°C. at a rate of about 5°C./minute, the temperature allowed to exotherm, and each mixture subsequently warmed for 5 hours at 160°C. Theoretical epoxide content for Examples 2 and 3 is 8 percent. Observed 7.81 percent and 7.82 percent for Examples 2 and 3, respectively.

Examples 4-6

The procedure of Example 2 was followed except that different catalysts were used and the finishing heating step was 2 hours at 160°C. instead of 5 hours. The catalysts here used were (4) 1-phenyl-3-(tri-n-butylphosphoranylidene)-2,5-pyrrolidinedione (0.458 g.), (5) 3-(diethyl phenyl phosphoranylidene)-2,5-pyrrolidinedione (0.408 g.) or (6) 3-(diphenyl ethyl phosphoranylidene)-2,5-pyrrolidinedione (0.478 g.). Theoretical epoxide content for Examples 4-6 is 8 percent. Observed 7.82 percent, 7.84 percent and 7.92 percent for Examples 4-6, respectively.

Precatalyzed epoxy resins were prepared by blending the diglycidyl ether of bisphenol A (EEW 187) with the catalysts named in Examples 1-6. These mixtures were stored for up to four weeks at 50°C. and used in experiments otherwise identical to Examples 1-6. The stored mixtures showed little, if any, loss in reactivity and their reaction products with phenols had essentially the same properties as those obtained in Examples 1-6.

The products produced in Examples 1-6 were substantially linear compounds. They are curable (cross-linkable) with conventional curing agents, such as dicyanamide, polyamines, anhydrides, etc. The cured resins are tough solvent resistant materials which are useful as coatings.

Branched and/or cross-linked products are similarly prepared in the instant process by (1) reacting an epoxy resin having at least 3 epoxy groups per molecule with a phenol having at least 2 hydroxyl groups, or (2) by reacting an epoxy resin having at least 2 epoxy groups per molecule with a phenol having at least 3 hydroxyl groups in the presence of the subject catalysts. Such branched and/or cross-linked products are likewise useful as coatings.

We claim:

1. A precatalyzed epoxy resin composition comprising (a) an epoxy resin bearing an average of more than one vicinal epoxy group per molecule and (b) a small but catalytic amount of a 3-(trihydrocarbylphosphoranylidene)-2,5-pyrrolidinedione.

2. The composition defined by claim 1 wherein (b) is a 1-hydrocarbyl-3-(trihydrocarbylphosphoranylidene)-2,5-pyrrolidinedione.

3. The composition defined by claim 2 wherein (b) is a 1-(alkyl or phenyl)-3-(trialkyl- or triarylphosphoranylidene)-2,5-pyrrolidinedione.

4. The composition defined by claim 1 wherein (b) is a 1-hydrogen-3-(trialkyl or triarylphosphoranylidene)-2,5-pyrrolidinedione.

5. The composition defined by claim 1 wherein (a) corresponds to the formula

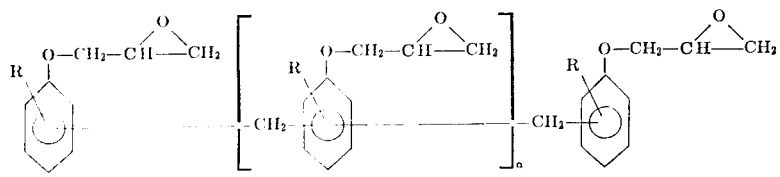

wherein R is hydrogen or an alkyl radical of 1–4 carbon atoms and $n$ varies from 0.1 to about 10.

6. The composition defined by claim 1 wherein (a) corresponds to the formula

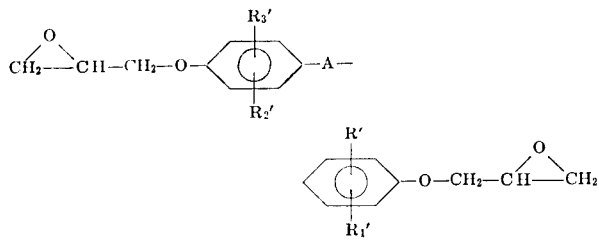

wherein R', R'$_1$, R'$_2$ and R'$_3$ are hydrogen, chloro or bromo;
and —A— is an alkylene or alkylidene group of from 1 to 4 carbon atoms or —A— is

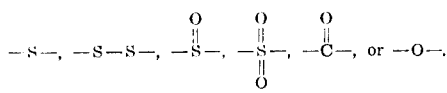

7. The composition defined in claim 6 wherein (a) is the diglycidyl ether of 4,4'-isopropylidenediphenol and (b) is 1-(hydrogen, methyl or phenyl)-3-(triphenylphosphoranylidene)-2,5-pyrrolidinedione or 1-phenyl-3-(tri-n-butylphosphoranylidene)-2,5-pyrrolidinedione or 3-(diphenylethyl- or diethylphenylphosphoranylidene)-2,5-pyrrolidinedione.

8. A composition comprising (a) an epoxy resin bearing an average of more than one epoxy group per molecule, (b) a polyhydric phenol and (c) a small but sufficient amount of a 3-(trihydrocarbylphosphoranylidene)-2,5-pyrrolidinedione to catalyze the reaction of (a) with (b) when warmed at a temperature of from about 50°C. to about 225°C.

9. The composition defined by claim 8 wherein (b) is polyhydric phenol of from 6 to about 30 carbon atoms bearing from 2 to 6 hydroxyl groups.

10. The composition defined by claim 9 wherein (b) is a polyhydric phenol corresponding to the formula

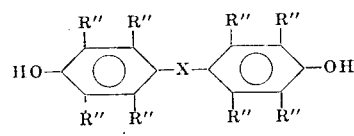

wherein R'' is hydrogen, fluoro, chloro, bromo or hydrocarbyl;
and X is a bivalent hydrocarbon radical, oxygen, sulfur, —SO—, —SO$_2$—, —OR'''O—, —OR'''OR'O—, —SR'''S—, —SR'''SR'''S—, —OSiO—, —O—SiOSiO—, —O—C(O)R'''C(O)O—, —C(O)—OR'''O—C(O)—, —S(O)R'''S(O)— or —SO$_2$R'''SO$_2$—, wherein R''' is a bivalent hydrocarbon radical.

11. The composition defined by claim 10 wherein (b) is 4,4'-isopropylidenediphenol.

12. The composition defined by claim 9 wherein (a) is an epoxy resin corresponding to the formulae

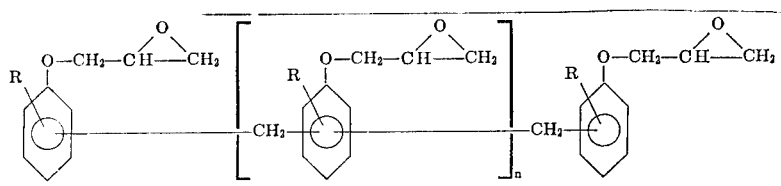

wherein R is hydrogen or an alkyl radical of 1–4 carbon atoms and $n$ is from about 0.1 to about 10, or

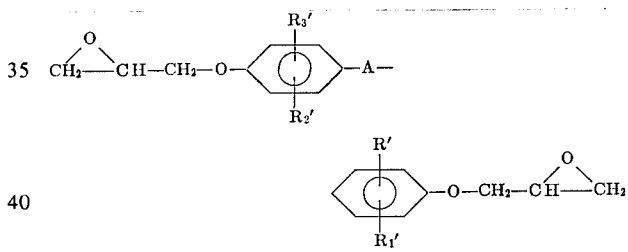

wherein R', R'$_1$, R'$_2$ and R'$_3$ are hydrogen, bromine or chlorine, and A is —S—, —S—S—, —S(O)—, —SO$_2$—, —C(O)—, —O—, alkylene of 1 to 4 carbon atoms or alkylidene of 1 to 4 carbon atoms, and wherein (c) is present in an amount of from about 0.001 to about 10 percent by weight, based on the combined weight of (a) and (b).

13. The composition defined by claim 12 wherein (a) is the diglycidyl ether of 4,4'-isopropylidenediphenol, (b) is 1-(hydrogen, methyl or phenyl)-3-(triphenylphosphoranylidene)-2,5-pyrrolidinedione or 1-phenyl-3-(tri-n-butylphosphoranylidene)-2,5-pyrrolidinedione or 3-(diphenylethyl- or diethylphenylphosphoranylidene)-2,5-pyrrolildinedione and (c) is 4,4'-isopropylidenediphenol, and wherein (b) is present in an amount of from about 0.05 to about 5 percent by weight, based on the combined weight of (a) and (b).

14. In the process of reacting by contacting a vicinal epoxide with a phenol, the improvement consisting of conducting said process at a temperature of from about 50°C. to about 225°C. in the presence of a small but catalytic amount of a 3-(trihydrocarbylphosphoranylidene)-2,5-pyrrolidenedione.

* * * * *